United States Patent

Wahl et al.

[11] Patent Number: 5,007,561
[45] Date of Patent: Apr. 16, 1991

[54] NON-FLOODING SET RATE FEEDER

[75] Inventors: Richard C. Wahl, Essex Falls; Ralph J. Winters, Nutley, both of N.J.

[73] Assignee: Vibra Screw, Incoporated, Totowa, N.J.

[21] Appl. No.: 474,216

[22] Filed: Feb. 2, 1990

Related U.S. Application Data

[63] Continuation of Ser. No. 13,943, Feb. 12, 1987, abandoned.

[51] Int. Cl.$^5$ ............................................. B67D 5/08
[52] U.S. Cl. .................................. 222/55; 222/371; 198/716; 177/121
[58] Field of Search ............... 222/55, 367, 371, 415; 177/16, 121; 198/716, 733, 821

[56] References Cited

U.S. PATENT DOCUMENTS

| | | | |
|---|---|---|---|
| 2,088,334 | 7/1937 | Merchen | 249/2 |
| 2,141,044 | 12/1938 | Rassmann | 222/371 |
| 2,252,460 | 8/1941 | Sinden | 198/716 |
| 2,559,614 | 7/1951 | Hapman | 198/716 |
| 3,147,850 | 9/1964 | Ronceray | 198/168 |
| 3,786,961 | 1/1974 | Wahl et al. | 222/55 |
| 3,884,313 | 5/1975 | Engels | 177/119 |
| 4,475,669 | 8/1984 | Wahl | 222/55 |
| 4,475,669 | 10/1984 | Wahl | 222/55 |

Primary Examiner—H. Grant Skaggs
Assistant Examiner—Kenneth Noland
Attorney, Agent, or Firm—Leitner, Greene & Christensen

[57] ABSTRACT

Apparatus for feeding fluidized particulate material at a uniform preselected flow rate includes a reservoir for receiving the material from a supply inlet, a device for maintaining material in the reservoir in a state of flux, a chain type carrier for continuously removing and transporting uniform quantities of the fluidized material at variable speed from the reservoir along a predetermined path configured to prevent premature discharge of the uniform quantities, and a control system to detect the quantities of material being transported along the predetermined path to regulate the speed of the carrier according to the desired preselected flow rate, such that the fluid particulate material is discharged at the desired flow rate at the end of the predetermined path.

17 Claims, 4 Drawing Sheets

NON-FLOODING SET RATE FEEDER

This is a continuation of application Ser. No. 07/013,943 filed Feb. 12, 1987, now abandoned.

BACKGROUND OF THE INVENTION

The present invention pertains generally to material feeders, and more particularly to a set rate feeder for transporting fluidized particulate material for processing.

Material feeders are commonly used to provide a continuous flow of material at a constant predetermined flow rate, for further processing. Gravimetric belt feeders discharge the material on a weight/time basis, and thereby automatically take into account any changes in the bulk density of the material. In one class of gravimetric feeders, of the continuous flow-set rate type, material is discharged into a process in a continuous stream at a predetermined rate. This class of feeder performs admirably with many types of particulate materials, but is not entirely suitable when the particulate is very finely divided to the point that the particles move freely among themselves, remaining in one mass, keeping the same volume, and taking the form of the containing vessel.

Such finely divided particulate materials or powders, as, for example, fly ash, and pulverized coal, are often referred to as fluid-like, fluidized or fluidizable, because they behave very nearly as fluids in the above-mentioned respects. When fluidized materials are to be transported in a feeder within a process they become difficult to control because of their tendency to entrain so much air that they act as liquid materials and gush out through any escape ports, such as the outlet of a bin, in a flood.

It is a principal object of the present invention to provide a process feeder which is capable of transporting fluidized particulate material at a continuous predetermined rate in a manner to control, and indeed prevent, flooding of the material.

Various types of continuous flow set rate feeders are known and in common use. In U.S. Pat. No. 3,786,961, Wahl et al. disclose a belt type continuous flow set rate gravimetric feeder in which material is discharged from the spout of a hopper onto a horizontally disposed endless belt mounted between spaced pulleys. A variable speed motor drives one of the pulleys. The belt is pivotally supported at one end by a pair of leaf springs, and pivots downwardly about a horizontal axis according to the weight of material on the belt. A load cell arranged at and beneath the opposite end of the belt senses this displacement of the belt, and generates an output signal corresponding to the displacement, and thus to the weight of the material on the belt. The output signal is supplied to circuitry for regulating the speed of the motor. In this manner, the belt speed is automatically adjusted to maintain a preset rate at which the material is discharged by the feeder.

Unfortunately, the belt feeder disclosed in U.S. Pat. No. 3,786,961 encounters the same types of problems as are experienced with all known conventional continuous flow set rate belt feeders when the particulate material is fluidized. The primary sources of these difficulties in conveying such material are the incapability of a flat belt feeder to retain a fluidized particulate without considerable runoff, and the aforementioned tendency toward flooding.

U.S. Pat. No. 4,475,669 to Wahl discloses a belt feeder which provides, among other things, a partial solution to the problem of conveying fluidized particulates through the use of a belt having a series of spaced apart cleats, wherein the cleats and the upper housing wall are almost in contact. The feeder constitutes an endless series of compartments that serve to hold the material and, to an extent, prevent runoff of the fluidized material. However, it has been found extremely difficult to uniformly fill the compartments with such material, and, hence, the desired steady pre-set rate is not readily achieved. The flooding property of fluidized materials renders a belt feeder virtually incapable of controllably transporting such materials, because the unrestrained flow simply inundates the equipment. It should be noted that screw feeders fare no better because they present a continuous open path around the helical screw shaft, and fluidized particulates will simply flush through that path.

Industrial practice often dictates that materials be pulverized, aerated and fluidized for easy transport, but reliable feeding of such materials on a belt or screw becomes so difficult for the foregoing reasons, that the anticipated ease of transport is self-defeating.

In U.S. Pat. No. 3,884,313 to Engels there is disclosed a feeding and measuring device for flowable solid materials, in which the device can act as a meter in the flow stream by holding material going through a weighing box such that all material has a uniform dwell time. The Engels device is not, strictly speaking, a feeder as that terminology is commonly used in the industry, because a feeder is capable of regulating the flow rate of the conveyed material over a range of values, whereas the Engels device merely accepts and discharges material at the rate it is poured into the inlet funnel. Moreover, scrapers utilized in the Engels device are incapable of containing fluidized particulate material since such material can readily flow over and around the scrapers. Thus, the Engels device cannot readily feed fluidized particulate material at a continuous pre-set rate.

Accordingly, it is another object of the present invention to provide a set rate feeder for accurately conveying and dispensing fluidized particulate materials at a controlled uniform rate despite variations in the rate at which the material is supplied to the feeder.

SUMMARY OF THE INVENTION

Briefly, according to the present invention, a feeding apparatus is adapted and configured to maintain a feed rate for fluidized material at a value which is selected by the operator, irrespective of the variable (i.e., non-uniform) rate at which the material is supplied to the apparatus. In essence, the apparatus comprises an endless series of cavities or pockets, each effectively sealed at front and back as it is translated through a conforming tube and over a load cell, such that there is a substantially constant number of cavities in the section of the feeding apparatus being weighed and each of those cavities is essentially uniformly filled with the fluidized material. The material in the cavities is restrained against flooding by plates between the advancing cavities and the conforming tube. The cavities, or pockets, moving through the tubular housing are thereby kept filled, and the weight sensing device regulates the speed with which the chain carrying the pockets is driven, to achieve a discharging of the fluidized material from the pockets at a constant weight rate.

In a preferred embodiment of the invention, a continuous flow set rate feeder particularly for fluidized particulate material includes a trough reservoir rigidly connected to an outlet housing by upper and lower rectangular tubes, and an endless chain having spaced apart pusher means forming the cavities thereon. According to an important feature of the invention, the pusher means are plates dimensioned, together with the chain by which they are transported, to conform closely to the interior of the upper and lower tubes, with tolerances such that the plates are slidable therethrough with very little clearance. The chain carries the cavities through the upper and lower tubes, around a pulley in the trough reservoir and a pulley in the outlet housing, one of these pulleys being coupled to a variable speed motor. Displacement means is also provided for measuring a displacement from the horizontal of a pivotally mounted portion of the feeder including the reservoir, the upper and lower tubes, and the outlet housing and for providing an output signal corresponding to this displacement. A control means, responsive to the output signal, regulates the speed of the motor, and thereby, the rate at which material carried in the pockets is discharged from the feeder.

According to another important aspect of the invention, a vibration means is affixed to the trough reservoir to continually vibrate the reservoir, thereby maintaining the particulate material in a state of flux so that the pockets formed by the pusher means continuously move through a coherent mass of material to insure that all pockets are uniformly filled. The vibration means will also agitate the material in the trough reservoir to produce a uniform density of the material so that all the pockets will have a uniform weight as well as a uniform fill. In addition, the vibration means which vibrates the entire feeder including the outlet housing will assist in the emptying of the pockets in the outlet housing.

Still another important aspect of the invention is the location of the reservoir with respect to the horizontal pivot axis of the feeder such that the continuous supplying of material to the reservoir from the supply source such as a hopper will have no effect on the weighing system. To that end, according to the invention, the flexure point at which the support pivot lies is precisely located along the axis of, and beneath, the inlet supplying the fluidized particulate material to the reservoir, so that the pressure or head load of the incoming material is balanced and exerts no net force either on the pivot or on the load sensor which detects the weight of the material carried toward the discharge outlet. Further, inasmuch as the reservoir constitutes a separate chamber, when the present invention is compared to prior art devices, for entraining fluidized particulate material into the moving cavities, the reservoir may be made symmetrical about the pivot point to assure that the material present in the reservoir will be balanced to a reasonably practicable extent, and therefore will exert no net force on the load sensor. Hence, regardless of filling pressure, head load, hydrostatic pressure, or quantity of material in the reservoir, only the weight of material in the cavities is detected by the load sensor when calibrated to zero out the mechanical weight of the empty device.

Accordingly, it is a further object of the invention to provide a continuous flow set rate feeder for fluid-like particulate material which is of relatively simple and inexpensive construction, and which reliably assures that the material will be conveyed at a predetermined uniform rate for processing.

Another object of the invention is to provide a continuous flow set rate feeder which is not dependent on the material supply source for accurate set rate feeding.

BRIEF DESCRIPTION OF THE DRAWINGS

The above and still further objects, features, aspects and attendant advantages of the present invention will become apparent to those of ordinary skill in the field to which the invention pertains from a consideration of the following detailed description of a preferred embodiment thereof, taken in conjunction with the accompanying drawings in which.

DESCRIPTION OF A PREFERRED EMBODIMENT

Referring now to the drawings, the construction of a preferred embodiment of a continuous flow, set rate, nonflooding feeder (hereinafter sometimes referred to as a chain feeder, in contrast to a belt feeder, for reasons which will become apparent in the ensuing description) is shown in FIGS. 1 through 5, inclusive. The chain feeder of the invention is especially adapted to feed fluidized particulate material, and may include an outer housing 10 to prevent ordinary access to the sensitive scale components during normal operation. The feeder may be mounted on any rigid horizontal surface in fixed relationship with a source of supply of the particulate material and an inlet point to a process to which the material is discharged in a continuous flow and with a set rate.

A substantially cylindrical spout or discharge line 12 is arranged to be coupled to a suitable supply hopper 15, and is flexibly connected to the upper inlet 17 of a trough reservoir or housing 19. As will be explained presently, the trough reservoir is arranged for vibratory motion on housing 10 or other support surface. The flexible coupling for discharge line 12 extends through a suitable sized hole in the upper wall of outer housing 10, and may be of an accordion-like configuration or any other conventional form which dampens any vibration imparted to the reservoir from being translated to the supply hopper and vice versa and also permits pivoting movement of the feeder with respect to the supply hopper 15.

The trough reservoir 19 is connected to an outlet housing 22 by a pair of tubes of preferably rectangular cross-section, comprising an upper tube 24 and a lower tube 25. Outlet housing 22 has an exit opening via a flexible cylindrical coupling 27 to a hole in the floor of carriage 10 from which material may be discharged as will be described presently.

An endless chain 29 moves through the upper and lower tubes 24, 25 about a pair of pulleys 31 and 32. Pulley 31 is mounted for rotation within trough reservoir 19 about an axis 35 perpendicular to and intersecting the axis 37 of the inlet discharge line 15. Pulley 32 is mounted for rotation within outlet housing 22 about an axis 39 parallel to the axis 35 of pulley 31, and, like axis 35, is located at the midpoint between the axis of upper and lower tubes 24 and 25. The dimensions of the two pulleys and the play (or lack thereof) in the chain 29 are such that when the pulleys rotate, the chain moves along and against the centermost wall of the respective tube. Thus, in upper tube 24, chain 29 moves along its lower wall, and in lower tube 25, the chain moves along that tube's upper wall.

Pulley 31 is driven by a variable speed motor 42, suitable gears 44 to translate the drive along the desired axis (in this embodiment a horizontal axis parallel to the axis 35 of pulley 31, relative to the vertically disposed motor 42), and a chain drive 47 which transfers the rotation imparted by the motor and the gears to the pulley 31 via sprockets on the respective hubs.

Chain 29 has a plurality of equally spaced plates 50 mounted thereon and configured to substantially conform to the interior cross-section of the identical upper and lower tubes 24 and 25, with a sufficiently close tolerance between the plates 50 and the tube cross-section to permit the plates 50 to slide through the tubes when the chain 29 is moving under the drive imparted by the pulley 31. The spacing between adjacent plates 50 is not critical, but they should not be separated by a gap so large that they will not enclose uniform quantities of the fluidized particulate material to be transported, as will become apparent from the ensuing description. For example, if the interior passageway cross-section of the upper and lower tubes 24 and 25 were, say, about two inches by three inches, the spacing between adjacent plates 50 on the chain 29 might suitably run from about two to three inches. Each plate 50 may have sides 51, integrally formed thereto with sides 51 suitably attached to chain 29 to support the plate 50 in its perpendicular relationship to the plane of chain 29.

The chain 29 may be of elastomeric material, however, preferably the chain and plates 50 are of steel for strength and ease of cleaning. A suitable chain 29 with plates 50 is the Type WS welded steel chain manufactured by Jeffrey Chain.

Figure 1:
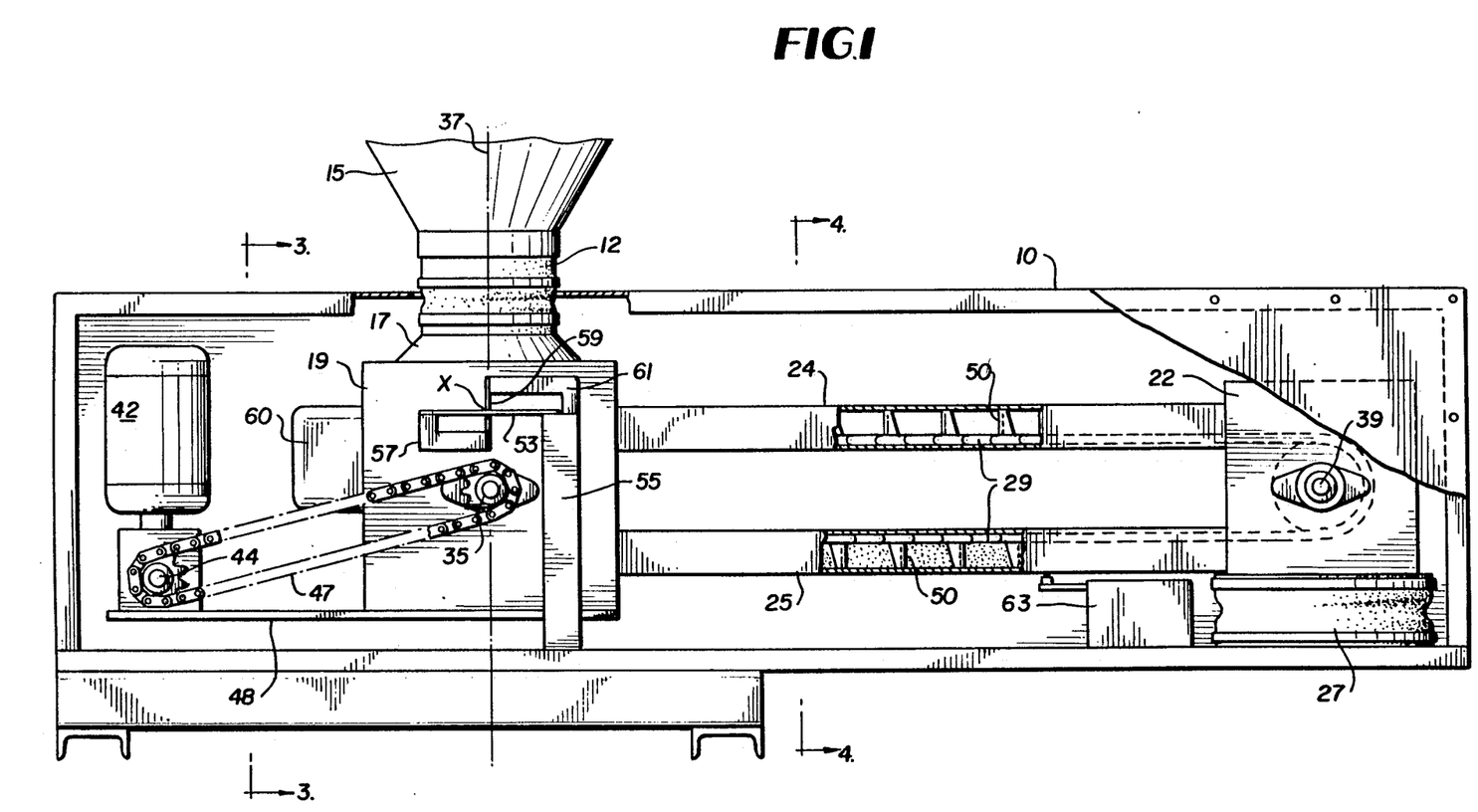
FIG. 1 is a side elevational view, partially broken away, of a non-flooding set rate feeder according to the invention.
Figure 2:
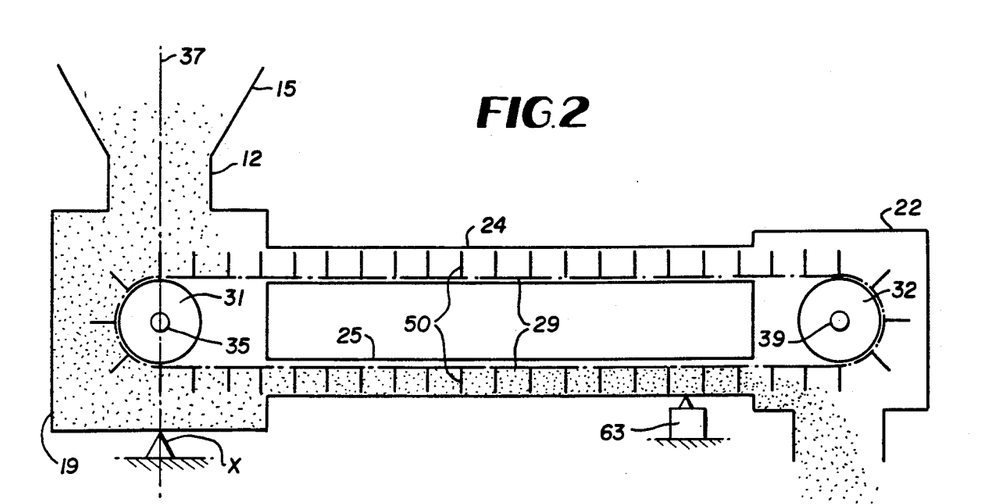
FIG. 2 is a side elevational view in schematic format of the feeder showing only the reservoir section, the discharge section and the endless chain with pusher means moving in upper and lower tubes.
Figure 3:
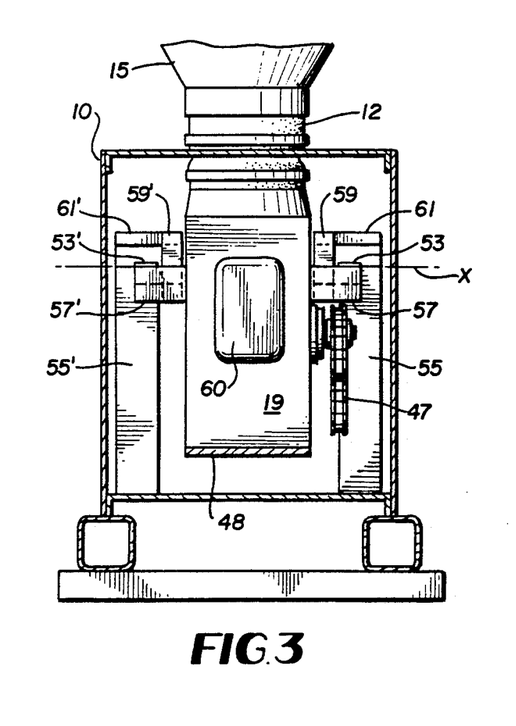
FIG. 3 is a sectional view taken along the lines 3—3 of FIG. 1.
Figure 4:
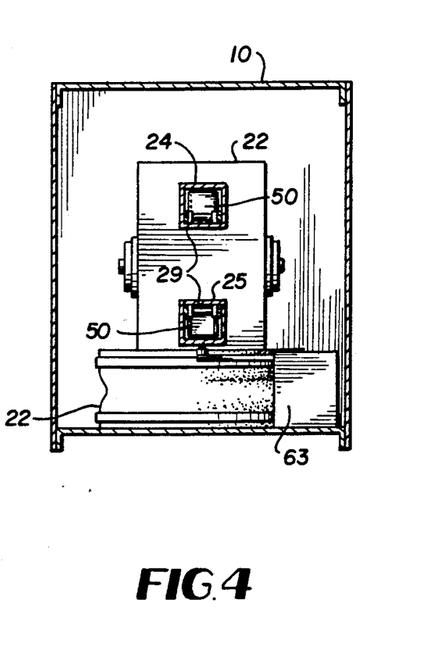
FIG. 4 is a sectional view taken along the lines 4—4 of FIG. 1.
Figure 5:
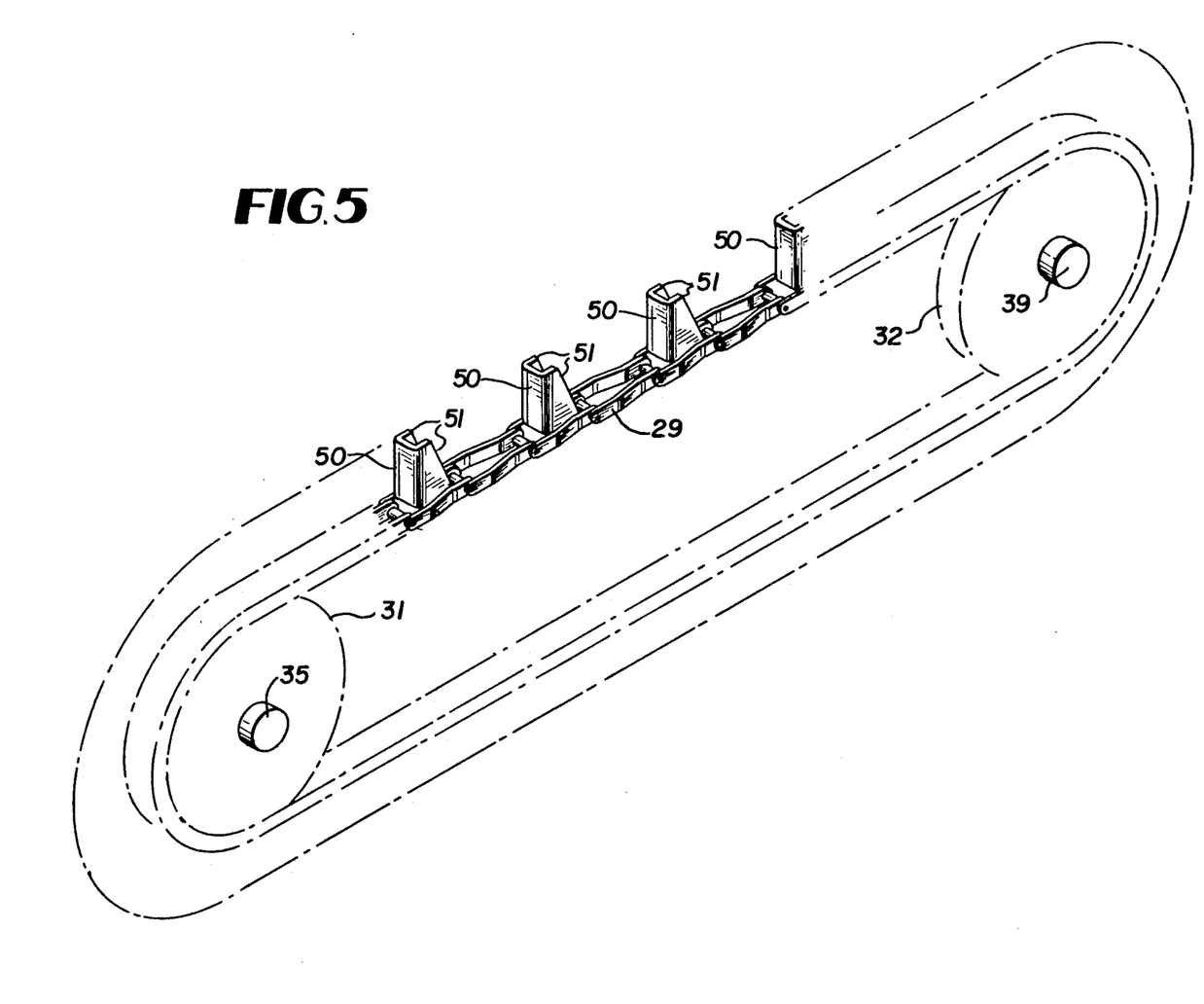
FIG. 5 is a partial perspective view of the endless chain mechanism and the driving and return pulleys.

It will be observed from FIGS. 1 and 3 that the overall chain feeder is supported by a pair of horizontally disposed leaf springs 53, 53' lying in the plane containing the portion of chain 29 in tube 24. Referring to the leaf spring 53, one end portion of the spring is securely fastened to the upper end of a support post 55. The other end portion of the leaf spring 53 is securely fastened to the upper end of right angle support member 57 that is affixed to the reservoir 19. The other leaf spring 53' is similarly secured in place and has one end securely fastened to upper end of post 55'. The other end portion of the leaf spring 53' is securely fastened to the upper end of right angle support member 57' that is affixed to the reservoir 19. Leaf springs 53, 53' lie perpendicular to and intersect the axis (center line) 37 of supply inlet 12. The support posts are rigidly mounted on the floor of housing 10 or other desired support surface, as by welding or use of conventional fasteners. This arrangement is such that the trough reservoir 19, and indeed, the entire chain feeder, is supported at and may pivot about the horizontal axis or flexure point X lying within the unconfined portions of the leaf springs 53, 53' Hence, as a load or force is exerted downwardly on the rectangular tubes 24 or 25 by the presence of fluidized particulate material in the lower tube, a corresponding vertical displacement of the tubes takes place with the pivoting of the chain feeder about the flexure point or horizontal axis X. To limit the displacement or pivoting range of the feeder, the horizontal axis X is preferably located as shown in FIG. 1 although any location along axis 37 is suitable such as shown schematically in FIG. 2 at the bottom of trough reservoir 19.

Although the use of the horizontal leaf springs 53, 53' is usually sufficient to support the feeder on posts 55, 55', it may be necessary in larger feeders to provide some vertical support to prevent deformation of leaf springs 53, 53' due to excessive weight in reservoir 19. Accordingly, additional vertical leaf springs 59, 59' may be provided. Referring to FIGS. 1 and 3, a second right angle support member 61 is suitably affixed to support post 55. One end portion of vertical leaf spring 59 is securely fastened to the side of member 61 and the other end portion of leaf spring 59 is securely fastened to the side of member 57. The other leaf spring 59' is similarly secured in place and has one end fastened to the side of right angle support member 61' that is suitably affixed to support post 55'. The other end portion of the leaf spring 59' is securely fastened to the side of right angle support member 57'. Leaf springs 59, 59' lie along axis (center line) 37 of supply inlet 12 and provide an additional pivot or flexure point within the unconfined portion of the leaf springs 59, 59' precisely along horizontal axis X.

A load sensor 63 is positioned at a point along either the upper tube 24 or the lower tube 25 near the outlet housing 22 to detect any downward force on the tubes as would occur if material from the reservoir 19 were entrained in tube 25, causing the chain feeder configuration to pivot about horizontal axis X in leaf springs 53, 53' and/or 59, 59'. Load sensor 63 is calibrated to detect zero force thereon when the rectangular tubes are unloaded; that is, when tubes 24 and 25 are empty except for the chain 29 and the plates 50 mounted on the chain. When loading is detected, the load sensor generates an output signal having an amplitude commensurate with the amount of the load; that is, corresponding to the magnitude of the force exerted on the sensor.

The overall structure of the chain feeder comprising trough reservoir 19, outlet housing 22, upper and lower tubes 24 and 25, pulleys 31 and 32, chain 29 and plates 50, leaf springs 53, 53', 59, 59', motor 42, chain drive 47 and related components is such that the filling pressure and head load attributable to the discharge of fluidized particulate material through the upper inlet 12 into the trough reservoir 19 will be balanced at either side of the pivot point X and will not, in and of itself, transmit a net force on the load sensor 63. This is attributable in part to the symmetry of the trough reservoir 19 with respect to the vertical axis 37 of the supply inlet 12. Further, it will be observed that the motor 42 and its associated gears 44 and chain drive 47 are mounted on a horizontal plate 48 affixed to the bottom of the trough reservoir 19 (e.g., by welding). These and other components of the chain feeder to the left of the vertical axis 37 (as viewed with the orientation depicted in FIGS. 1 and 2) balance out, and thereby act as a counterweight to the portions of the chain feeder to the right of that axis, including the tubes 24, 25, the outlet housing 22, and so forth.

In operation of the chain feeder of FIGS. 1-5, fluidized particulate material is discharged from a supply hopper 15 through inlet 12 into the chamber of trough reservoir 19. In general, the material will be supplied to the reservoir at an uneven rate and, as noted above, it is an important feature of the present invention that the flow rate at the discharge outlet of the feeder is completely independent of the fluctuation of supply rate so long as the supply is sufficient to support the discharge rate. The chain feeder may be conventionally arranged to commence operation (that is, to drive chain 29) when material is dispensed into the reservoir 19, the plates 50 within the tubes 24 and 25 closest to the opening thereof from the reservoir would serve to block entry of the material into the tubes, at least to an extent that other than insignificant loading of the tubes might occur.

As the chain 29 undergoes movement about pulleys 31 and 32 in response to the drive imparted to pulley 31 by variable speed motor 42 and associated gears 44 and chain 47, the plates 50 operate as pusher means to entrain the fluidized particulate material within the reservoir into the lower tube 25. Since each plate substantially conforms to the internal dimensions of the tubes 24, 25, the fluidized material is for all practical purposes precluded from escaping backward or forward through tube 25 as a result of flooding or gushing of the material. The use of an elastomeric or plastic material for chain 29 may be substituted for an ordinary link chain, if desired, but it has been observed by the inventors that there is no significant difference in the capability of the chain feeder of the present invention to prevent flooding of the fluidized particulate material regardless of which type of chain is used for mounting of the pusher plates.

In this operation, the pusher plates 50 define a series of cavities within the tube which, by the nature of the tolerances between the plates and the tube, are uniformly filled with the fluidized material from the reservoir as the chain moves through the reservoir chamber. Accordingly, a constant force or load is detected by the load sensor 63 to maintain the speed of motor 42, and thus the speed of the chain 29, at the continuous predetermined rate set by the operator of the chain feeder. This results in a discharge of the fluidized material from the outlet 27 at a constant flow rate, which, in this particular embodiment, is a constant weight rate.

It was noted earlier herein that fluidized material is so termed because of its tendency to behave as a fluid. Nevertheless, it may happen as a consequence of the chain speed and other factors including the extent to which the material is finely divided, that the pusher plates 50 will tend to plow a furrow through the particulate and thereby ultimately cause the moving cavities to be only partially filled or even unfilled. This of course, would cause a non-constant flow rate of particulate material at the discharge outlet but for the changing load detected by load sensor 63 and the consequent adjustment of the variable speed motor 42 to compensate and return to a constant flow at the preset rate. To better control and maintain the desired constant flow rate, the present invention provides means for maintaining the particulate material in the reservoir 19 in a state of flux, that is, undergoing constant movement.

To that end, the reservoir 19 has a vibrator motor or electromechanical gyrator 60 mounted thereon, with eccentric weights coupled to the gyrator to cause horizontal vibration of the trough reservoir. The vibrating means may correspond, except for specific location, to that described in connection with FIG. 4 of the aforementioned Wahl et al. U.S. Pat. No. 3,786,961, but it is worthy of emphasis that the purpose of the vibrating means in that patent is different from that of the present invention. In the Wahl et al. patent, the vibrating means is intended to assure that material will flow continuously from the supply hopper; in contrast to a primary feature of the present invention in which the vibration is imparted to the trough reservoir to assure that the particulate material remains in a state of flux, thereby avoiding furrowing by the pusher means. Additionally, the vibration conditions the material to a uniform density and assists in discharging of the material at the outlet housing.

The actual movement of the reservoir during vibration need only be slight, so that it has no deleterious effect on the moving parts of the chain feeder apparatus; and the horizontal motion of the trough reservoir 19 during vibration avoids imparting any false measurements by the load sensor 58, which is conditioned to detect vertical displacement of the tube section of the apparatus. This vibratory motion of the reservoir assures that the fluidized material flows into the furrow at the moment it is plowed, so that the material is continuously present to the moving chain and the pusher plates thereon as a uniform fluid mass, and the cavities formed by the plates 50 and the interior walls of tube 25 are uniformly filled with particulate of uniform density.

Figure 6:
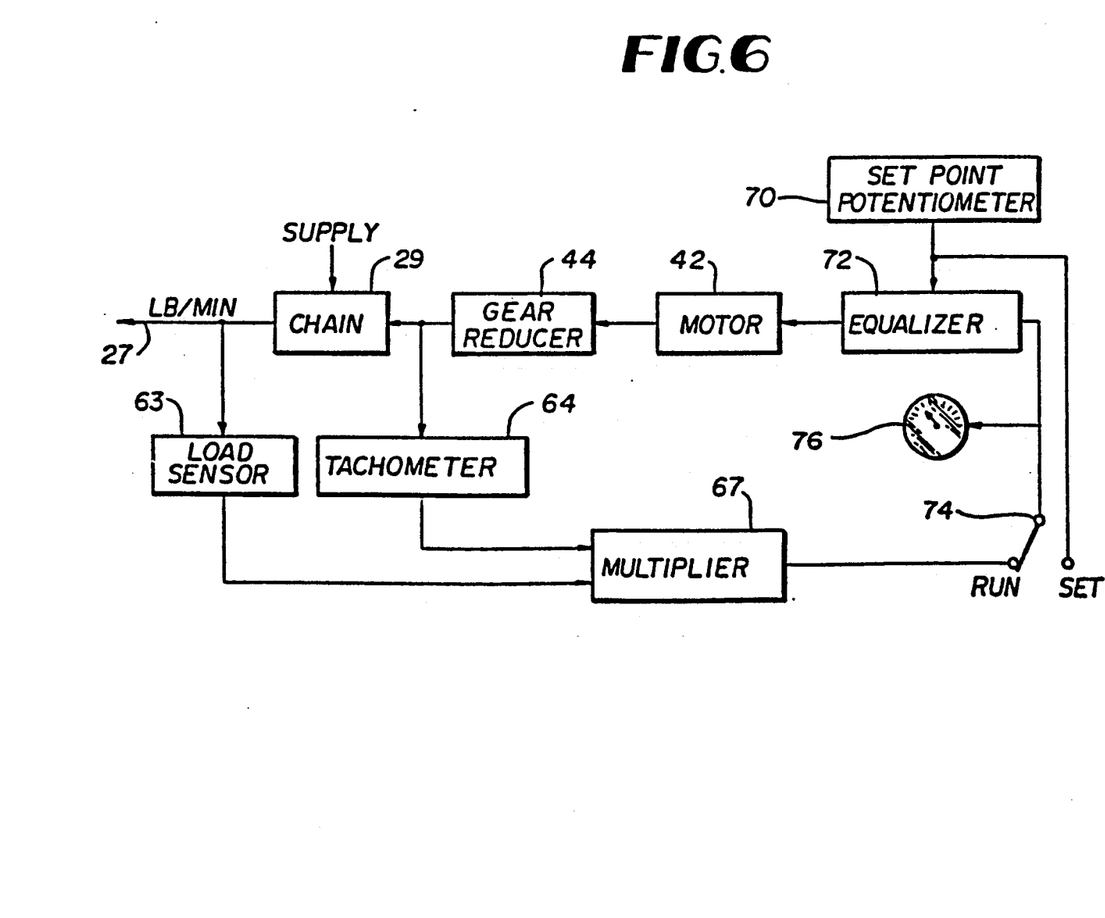
FIG. 6 is a block diagram of the control system of the present invention.

The control system for regulating the speed of variable speed motor 42 to maintain the preset flow rate for discharging material from the chain feeder may take the form described in the aforementioned U.S. Pat. No. 4,475,669 to Wahl, which is assigned to the same assignee as the instant patent application. For the sake of convenience of reference, the basic configuration of that control system is shown in FIG. 6. Referring to that FIG., fluidized particulate material is entrained by the pusher plates 50 on moving chain 29 into lower tube 25 from the trough reservoir 19. As previously described, the chain for the pusher means is driven by motor 42 through gear reducer 44 and pulley 31, thereby moving the series of cavities formed by the pusher plates, the chain and the lower tube until the material retained in those cavities is discharged at discharge outlet 27 to a desired point within an overall process.

The weight of the entrained material in lower tube 25 (depicted in FIG. 6 as being on the chain) is sensed by load sensor 63 which may, for example, comprise a conventional load cell such as a strain gauge, lvdt or a hydraulic load cell. The load sensor includes calibration means to null out the effective weight of everything but the particulate material entrained by the series of moving cavities. As described above, the symmetry of the trough reservoir pivot point, leaf springs, drive pulleys, motor, gears, drive chain, tubes, outlet housing and so forth, about the axis of the supply inlet removes any net loading by the overall chain feeder on the load sensor, even as the fluidized particulate material is being dispensed into the trough reservoir. Thus, the amplitude of the signal voltage generated by the load sensor is directly related to the weight of the fluidized particulate material entrained in the tube 25, and more particularly, the material entrained in the series of cavities. The velocity of the chain is detected and converted by a tachometer 64 into a proportional signal which, together with the output signal from the load sensor, is applied a multiplier 67 which generates an output signal proportional to the weight of the particulate material delivered per unit time, that is, the actual flow rate of the chain feeder.

The desired flow rate or set rate, in weight of particulate material to be delivered (discharged) per unit time by the chain feeder at discharge outlet 27, is preset by the operator on a manually adjustable set point potentiometer 70. The potentiometer applies a signal of constant amplitude representative of this predetermined flow rate to an equalizer 72, and also to the set pole of a switch 74 which, when the switch is in the SET position, allows the selected rate setting to be read on meter 76 as the potentiometer 70 is being adjusted by the operator and at any time thereafter. When switch 74 is thrown to the RUN position, meter 76 reads the output of multiplier 67, indicating the actual flow rate of the chain feeder.

Equalizer 72 is a comparator which performs a comparison of the set rate and the actual rate, to provide a difference signal or error signal of proper polarity to motor 42 for adjusting the latter's speed, thereby bring the speed of chain 29 to a value which will equalize the actual and set rates. Of course, when the two rates are equal, the error signal is nulled.

While a preferred embodiment of the invention has been described herein, it will be readily apparent to those skilled in the art to which the invention pertains from a consideration of the foregoing description that various modifications of the preferred embodiment may be made without departing from the inventive principles set forth herein. For example, upper tube 24 and lower tube 25 may be formed in a single housing with appropriate partition members to form the paths for the chain 29 between reservoir 19 and outlet housing 22. Also, it should be obvious that the configuration of upper tube 24 may be of larger cross-sectional dimensions than plates 50 when flowing of the material from reservoir 19 into upper tube 24 is not a problem such as with non-flooding material. Accordingly, it is desired that the invention be limited only to the extent required by the following claims.

We claim:

1. Apparatus mounted for pivotal movement about an horizontal axis for feeding fluid-like particulate material comprising:
    a substantially enclosed trough housing having side walls and a bottom wall to contain and support said material, said trough housing having an inlet spaced above said bottom wall for receiving said material from a supply means, said inlet and said trough housing including said side walls being symmetrical about a vertical axis of symmetry so that material entering and contained and enclosed by said trough housing will be uniformly distributed on said bottom wall and within said trough housing side walls about said axis of symmetry,
    an outlet means having an exit opening for discharging the material,
    a first tube member interconnecting said trough housing and said outlet means,
    a series of connected pusher means movable into said trough housing and through said material contained in said enclosed trough housing and out of said trough housing into said first tube member for moving material in a uniform quantity from said trough means to said outlet means,
    a variable speed control motor coupled to said pusher means through a first pulley,
    displacement means for measuring a displacement from the horizontal of said apparatus and for producing an output signal corresponding to said displacement, and
    control means responding to said output signal for regulating the speed of said motor.

2. Apparatus according to claim 1, further including:
   means for vibrating said apparatus.

3. Apparatus according to claim 1, further including:
   pivotal support means for said trough housing to permit displacement of said apparatus from the horizontal.

4. Apparatus according to claim 3, wherein:
   said trough housing is symmetrical about said inlet and said pivotal support means is located to pivot said trough housing on the axis of symmetry below said inlet.

5. Apparatus according to claim 1, further including:
   a second tube member interconnecting said trough housing and said outlet means.

6. Apparatus according to claim 1, wherein:
   said displacement means includes a transducer for generating said output signal with a magnitude proportional to the weight of the material contained within said first tube member under the action of said connected pusher means.

7. Apparatus mounted for pivotal movement about an horizontal axis for feeding fluid-like particulate material comprising:
    a trough means having an inlet for receiving said material from a supply means,
    pivotal support means for said trough means, to permit displacement of said apparatus from the horizontal, said trough means is symmetrical about said inlet and said pivotal support means is located to pivot said trough means on the axis of symmetry below said inlet,
    an outlet means having an exit opening for discharging the material,
    a first tube member interconnecting said trough means and said outlet means,
    a series of connected pusher means movable through said trough means and into said first tube member for moving material in a uniform quantity from said trough means to said outlet means,
    a variable speed control motor coupled to said pusher means through a first pulley, said first pulley is located within said trough means and the horizontal axis of said first pulley intersects said axis of symmetry,
    displacement means for measuring a displacement from the horizontal of said apparatus and for producing an output signal corresponding to said displacement, and
    control means responding to said output signal for regulating the speed of said motor.

8. Apparatus according to claim 7 further including:
   means for maintaining any fluid-like particulate material in said trough means in a conditioned state.

9. Apparatus according to claim 7, further including a second tube member interconnecting said trough means and said outlet means, said second tube member providing a return path for said connected pusher means between said outlet means and said trough means.

10. Apparatus mounted for pivotal movement about an horizontal axis for feeding fluid-like particulate material comprising:

a trough means having an inlet for receiving said material from a supply means, pivotal support means for said trough means, to permit displacement of said apparatus from the horizontal, said trough means is symmetrical about said inlet and said pivotal support means is located to pivot said trough on the axis of symmetry below said inlet, said pivotal support means including leaf springs supporting said trough means and providing a horizontally disposed axis for pivoting thereof, said horizontally disposed axis intersecting said axis of symmetry, an outlet means having an exit opening for discharging the material, a first tube member interconnecting said trough means and said outlet means, a series of connected pusher means movable through said trough means and into said first tube member for moving material in a uniform quantity from said trough means to said outlet means, a variable speed control motor coupled to said pusher means through a first pulley, displacement means for measuring a displacement from the horizontal of said apparatus and for producing an output signal corresponding to said displacement, and control means responding to said output signal for regulating the speed of said motor.

11. Apparatus mounted for pivotal movement about an horizontal axis for feeding fluid-like particulate material comprising:

a trough means having an inlet for receiving said material from a supply means, an outlet means having an exit opening for discharging the material, a first tube member interconnecting said trough means and said outlet means, a second tube member interconnecting said trough means and said outlet means, a series of connected pusher means movable through said trough means and into said first tube member for moving material in a uniform quantity of said trough means to said outlet means, the dimensions of each of said connected pusher means provide a close fit between each pusher means and the interior cross-section of said first tube member, whereby each of said pusher means may move through said first tube member while securely retaining any of said material between itself and the next adjacent pusher means moving through said first tube member, said second tube member providing a return path for said connected pusher means between said outlet means and said trough means, about a second pulley, after discharge of the material retained between adjacent pairs of said pusher means from said exit opening of said outlet means, a variable speed control motor coupled to said pusher means through a first pulley, displacement means for measuring a displacement from the horizontal of said apparatus and for producing an output signal corresponding to said displacement, and control means responding to said output signal for regulating the speed of said motor.

12. Apparatus mounted for pivotal movement about an horizontal axis for feeding fluid-like particulate material comprising:

a substantially enclosed trough means having an inlet for receiving said material from a supply means, said inlet and said trough means being symmetrical about a vertical axis of symmetry so that material entering said trough means will be uniformly distributed about said axis of symmetry, pivotal support means for said trough means, to permit displacement of said apparatus from the horizontal, an outlet means having an exit opening for discharging the material, a first tube member interconnecting said trough means and said outlet means, a series of connected pusher means movable through said enclosed trough means and into said first tube member for moving material in a uniform quantity from said trough means to said outlet means, a variable speed control motor coupled to said pusher means through a first pulley, said first pulley is located within said trough means and the horizontal axis of said first pulley intersects said axis of symmetry, displacement means for measuring a displacement from the horizontal of said apparatus and for producing an output signal corresponding to said displacement, and control means responding to said output signal for regulating the speed of said motor.

13. Apparatus according to claim 12 further including means for maintaining the fluid-like particulate material in said trough means in a conditioned state.

14. Apparatus according to claim 12 further including a second pulley in said outlet means, said series of connected pusher means includes an endless chain passing around said first and second pulleys.

15. Apparatus according to claim 14 wherein said connected pusher means include a plurality of spaced plates mounted on said endless chain with the dimensions of end of said plates providing a close fit between each plate and the interior cross-section of said first tube member, whereby each of said plates may move through said first tube member while securely retaining any of said material between itself and the next adjacent plate moving through said first tube member.

16. Apparatus according to claim 15 further including a second conduit means interconnecting said trough means and said outlet means, said second conduit means providing a return path for said connected pusher means between said outlet means and said trough means.

17. Apparatus according to claim 16 wherein said second conduit means is a second tube member having a similar interior cross-section as said first tube member whereby said spaced plates in said second tube member will substantially prevent said material in said trough means from entering said second tube member.

* * * * *